Figure 1:
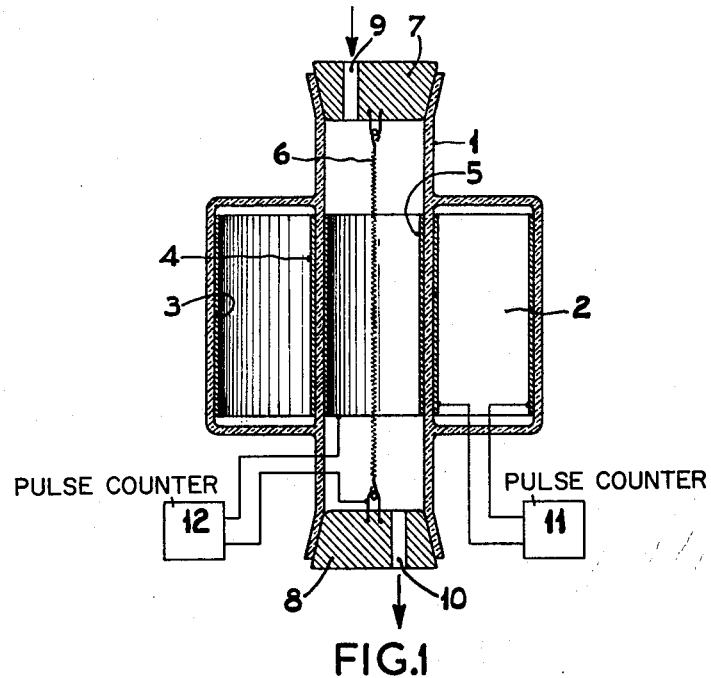

Jan. 2, 1962   J. H. SPAA ET AL   3,015,729
APPARATUS FOR MEASURING THE RADIOACTIVITY
OF PARTICLES IN A GAS
Filed July 18, 1958

INVENTORS
JACOB HENDRIK SPAA
EDWARD FOKKO DE HAAN
BY
AGENT

3,015,729
APPARATUS FOR MEASURING THE RADIOACTIVITY OF PARTICLES IN A GAS

Jacob Hendrik Spaa and Edward Fokko de Haan, Eindhoven, Netherlands, assignors to North American Philips Company, Inc., New York, N.Y., a corporation of Delaware
Filed July 18, 1958, Ser. No. 749,525
Claims priority, application Netherlands July 26, 1957
10 Claims. (Cl. 250—83.6)

The present invention relates to apparatus for measuring radioactivity. More particularly, the invention relates to apparatus for measuring the radioactivity of dust particles contained in air.

In order to ascertain to what extent air is contaminated radioactively, it is known to direct a certain amount of air through a filter and subsequently to measure the radioactivity of the dust filtered off, for example, by means of a Geiger-Müller counter or a scintillation counter.

It has also been suggested to precipitate the dust contained in a certain amount of air by electrostatic means, for example, onto a tape which is moved past a Geiger counter.

This enables α-, β- and γ-radiations to be measured. These known methods have a limitation in that they require comparatively complicated apparatus for the precipitation of the dust.

The present invention provides an apparatus which is simpler in this respect and in which the geometrical conditions are an optimum for the detection of the radio active radiation.

Counters have been suggested in which the anode is not in the form of a wire, as is usual in Geiger-Müller counters, but in the form of a cylinder of comparatively large diameter. In certain counters of this kind the wall of the chamber containing the anode and the cathode is made of very thin glass. The said electrodes are applied concentrically to the glass wall of the space from which the ambient atmosphere is excluded. This apparatus is particularly suited for the examination of liquids for radioactivity. A certain amount of the liquid to be examined is poured into the cylindrical space within the anode. Preferably the wall of the inner space is made from glass which has been rendered conductive in known manner by means of stannic oxide. Use can also be made of a thin metal wall. These apparatus are particularly suited for measuring the β- and γ-radiations.

The present invention is based on the recognition that such an apparatus can be adapted in a simple manner to the examination of aerosols.

According to the invention, in an apparatus for the examination of the radioactivity of aerosols with the aid of a Geiger counter and means for the electrostatic precipitation of the dust from the gas, more particularly from air, the counter is provided with a hollow anode comprising a continuous channel which is suitable for the passage of the gas to be examined and in which the means for the electrostatic deposition of the dust are mounted.

Similarly to the arrangement of the above-described known counter, the cylindrical cathode can be arranged concentrically about the anode, both electrodes being accommodated in a glass vessel which is filled with a certain gas, which is suitable as an ionisation medium, at a certain pressure. Between the anode and the cathode there is connected in known manner a device for counting the pulses, which in this case substantially correspond to the β- and γ-radiations emitted by the dust.

For the precipitation of the dust from the passing air use is made of a wire which is stretched in the continuous channel preferably concentrically therewith and to which a comparatively high potential with respect to the surrounding electrode is applied. The dust precipitates particularly on to the conductive part of the channel wall. Since the counting space entirely encloses the precipitated dust, the counting efficiency is particularly high.

Furthermore, according to the invention the α-radiation can be determined by connecting between this wire and the electrode surrounding it a second counting circuit which counts proportionally. In this arrangement, the roughness of the dust surface might be screened by means of a grid arranged concentrically about the wire in the proximity of the surrounding electrode, for example in the form of a helically coiled wire, which is at a constant potential.

Figure 2:
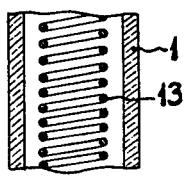

In order that the invention may readily be carried into effect, it will now be described with reference to the accompanying drawing, wherein:

FIG. 1 is a schematic diagram, in lateral cross-section, of an embodiment of the apparatus of the present invention; and FIG. 2 is a schematic diagram, in lateral cross-section, of a portion of a modification of the embodiment of FIG. 1.

In FIG. 1, reference numeral 1 denotes a cylindrical glass vessel which forms an integral structure with a likewise cylindrical part 1' of larger diameter. Between the parts 1 and 1' a closed space 2 is formed which contains the counting gas. Within this space provision is made of electrodes 3 and 4 which are designed as open cylinders disposed concentrically about each other, the electrode 3 acting as the cathode and the electrode 4 as the anode. These electrodes, more particularly the electrode 4, can be designed as part of the enclosing wall, which for this purpose can be rendered conductive in known manner, for example by means of stannic oxide.

The cylindrical channel is closed at both ends by stoppers 7 and 8 having apertures 9 and 10 which act as the inlet and outlet respectively for the air to be examined. The stoppers 7 and 8 also serve as stay members for a concentrically stretched conductive straight or helical wire 6 a high voltage of, for example, a few thousand volts, is applied to the helical wire 6 with respect to an electrode 5. The electrode 5 is disposed on the inner surface of the central channel and may form an integral structure with the electrode 4.

The electrodes 5 and 6 co-operate to precipitate the dust from the air passed through the channel onto the inner surface thereof. The air can be passed through for a certain period of time, the radioactivity of the precipitated dust being subsequently measured in known manner with the aid of a counter 11.

Alternatively the number of pulses per second can be recorded during the passage of the air, the shape of the obtained curve providing indications about the variation of the radiation in time or in direction.

The α-radiation is measured by means of a counter 12, which is connected between the wire and the electrode 6 and by means of which a suitable potential difference is produced between these two electrodes. Provision may be made in the manner shown in FIG. 2 of a grid-shaped structure 13 which screens the dust layer from the wire and is at a constant potential which corresponds to the potential of the electrode 5. In this arrangement, the latter electrode preferably comprises the vessel wall which is rendered conductive.

The precipitated dust preferably settles on the wall of the first part of the channel. In order to ensure a more even distribution along the length of the channel, a voltage drop can be produced across the wall in the direction of length thereof. This can be ensured by providing electrodes at different potentials at the beginning and at the end of said channel. Thus a current passes through the glass wall which has been made conductive.

The air current through the channel can be obtained in different manners, for example by means of a suitable ventilator. Under certain conditions it will be sufficient to dispose the apparatus vertically and to heat the lower end in order to obtain an adequate air current.

What is claimed is:

1. Apparatus for measuring the radioactivity of particles in a gas with a Geiger type counter, comprising anode and cathode electrodes of substantially tubular configuration arranged in concentric spaced relationship, means for directing said gas through the inner one of said electrodes, a closed substantially tubular housing enclosing said electrodes, and means positioned in said inner electrode for causing the electrostatic precipitation within said inner electrode of particles from said gas.

2. Apparatus for measuring the radioactivity of particles in a gas with a Geiger type counter, comprising an anode of substantially cylindrical configuration, means for directing said gas through said anode, a closed substantially cylindrical housing surrounding said anode, a cathode of substantially cylindrical configuration surrounding said anode in spaced relation therefrom in said housing, and means positioned in said anode for causing the electrostatic precipitation within said anode of particles from said gas.

3. Apparatus for measuring the radioactivity of particles in a gas with a Geiger type counter, comprising an anode of substantially cylindrical configuration, means for directing said gas through said anode, a closed substantially cylindrical housing surrounding said anode, a cathode of substantially cylindrical configuration surrounding said anode in spaced relation therefrom in said housing, and means positioned in said anode for causing the electrostatic precipitation within said anode of particles from said gas, said electrostatic precipitation means including an electrically conductive wire positioned substantially axially in the said anode.

4. Apparatus for measuring the radioactivity of particles in a gas with a Geiger type counter, comprising an anode of substantially cylindrical configuration, means for directing said gas through said anode, a closed substantially cylindrical housing surrounding said anode, a cathode of substantially cylindrical configuration surrounding said anode in spaced relation therefrom in said housing thereby forming a substantially annular space between the said anode and said cathode, the ambient atmosphere being excluded from said space, means positioned in said anode for causing the electrostatic precipitation within said anode of particles from said gas, and means connected between said anode and said cathode for counting $\beta$ and $\gamma$ radiations.

5. Apparatus for measuring the radioactivity of particles in a gas with a Geiger type counter, comprising an anode of substantially cylindrical configuration, means for directing said gas through said anode, a closed substantially cylindrical housing surrounding said anode, a cathode of substantially cylindrical configuration surrounding said anode in spaced relation therefrom in said housing thereby forming a substantially annular space between the said anode and said cathode, the ambient atmosphere being excluded from said space, means positioned in said anode for causing the electrostatic precipitation within said anode of particles from said gas to the said anode, and means connected between said anode and said cathode for counting $\beta$ and $\gamma$ radiations.

6. Apparatus for measuring the radioactivity of particles in a gas with a Geiger type counter, comprising an anode of substantially cylindrical configuration, means for directing said gas through said anode, a closed substantially cylindrical housing surrounding said anode, a cathode of substantially cylindrical configuration surrounding said anode in spaced relation therefrom in said housing thereby forming a substantially annular space between the said anode and said cathode, the ambient atmosphere being excluded from said space, means positioned in said anode for causing the electrostatic precipitation within said anode of particles from said gas, said electrostatic precipitation means including an electrically conductive wire positioned substantially axially in the said anode, means connected between said anode and said cathode for counting $\beta$ and $\gamma$ radiations, and means connected between said wire and said anode for counting $\alpha$ radiations.

7. Apparatus for measuring the radioactivity of particles in a gas with a Geiger type counter, comprising an open-ended vessel of electrically insulating material in substantially cylindrical configuration, an anode of substantially cylindrical configuration positioned substantially adjacent said vessel in concentric relation thereto, means for directing said gas through said vessel, a closed-ended substantially cylindrical housing surrounding said vessel, a cathode of substantially cylindrical configuration surrounding said anode in spaced relation therefrom in said housing, and means positioned in said vessel for causing the electrostatic precipitation within said anode of particles from said gas.

8. Apparatus for measuring the radioactivity of particles in a gas with a Geiger type counter, comprising an open-ended vessel of electrically insulating material in substantially cylindrical configuration, a cylindrical portion of said vessel being of electrically conductive material thereby to form an anode, means for directing said gas through said vessel, a closed-ended substantially cylindrical housing surrounding said vessel, a cathode of substantially cylindrical configuration surrounding said anode in spaced relation therefrom in said housing, and means positioned in said vessel for causing the electrostatic precipitation within said anode of particles from said gas.

9. Apparatus for measuring the radioactivity of particles in a gas with a Geiger type counter, comprising an open-ended vessel of electrically insulating material in substantially cylindrical configuration, a cylindrical portion of said vessel being of electrically conductive material thereby to form an anode, means for directing said gas through said vessel, a closed-ended substantially cylindrical housing surrounding said vessel, a cathode of substantially cylindrical configuration surrounding said anode in spaced relation therefrom in said housing, means positioned in said vessel for causing the electrostatic precipitation within said anode of particles from said gas, and a grid positioned within said vessel in proximity to said conductive portion of the said vessel in concentric relation thereto.

10. Apparatus for measuring the radioactivity of particles in a gas with a Geiger type counter, comprising an open-ended vessel of electrically insulating material in substantially cylindrical configuration, a cylindrical portion of said vessel being of electrically conductive material thereby to form an anode, means for directing said gas through said vessel, a closed-ended substantially cylindrical housing surrounding said vessel, a cathode of substantially cylindrical configuration surrounding said anode in spaced relation therefrom in said housing, means positioned in said vessel for causing the electrostatic precipitation within said anode of particles from said gas, and means for producing a potential variation along said vessel in the axial direction thereof.

References Cited in the file of this patent

UNITED STATES PATENTS

| | | |
|---|---|---|
| 2,462,890 | Newman | Mar. 1, 1949 |
| 2,576,616 | Livingston et al. | Nov. 27, 1951 |
| 2,735,944 | Greer | Feb. 21, 1956 |
| 2,736,812 | Weinstein et al. | Feb. 28, 1956 |
| 2,755,391 | Keyes | July 17, 1956 |
| 2,899,582 | Hermsen et al. | Aug. 11, 1959 |